(12) United States Patent
Medapalli et al.

(10) Patent No.: US 8,750,236 B2
(45) Date of Patent: *Jun. 10, 2014

(54) SELECTING A TRANSMISSION MODE BETWEEN A SUBSCRIBER AND A BASE STATION

(75) Inventors: Kameswara Medapalli, Santa Clara, CA (US); Djordje Tujkovic, Santa Clara, CA (US); Kamlesh Rath, Santa Clara, CA (US); Louay Jalloul, Santa Clara, CA (US); Bertrand Hochwald, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 13/618,895

(22) Filed: Sep. 14, 2012

(65) Prior Publication Data
US 2013/0010734 A1 Jan. 10, 2013

Related U.S. Application Data

(63) Continuation of application No. 12/456,562, filed on Jun. 18, 2009, now Pat. No. 8,311,003.

(60) Provisional application No. 61/132,480, filed on Jun. 18, 2008.

(51) Int. Cl.
H04W 72/02 (2009.01)

(52) U.S. Cl.
USPC ........................................................ 370/329

(58) Field of Classification Search
CPC ...................................................... H04W 7/02
See application file for complete search history.

(56) References Cited

U.S. PATENT DOCUMENTS

| | | | |
|---|---|---|---|
| 6,400,954 B1 * | 6/2002 | Khan et al. | 455/450 |
| 2005/0128976 A1 | 6/2005 | Uehara et al. | |
| 2005/0250540 A1 | 11/2005 | Ishii et al. | |
| 2006/0105717 A1 | 5/2006 | Kwon et al. | |
| 2007/0238430 A1 | 10/2007 | Himayat et al. | |
| 2008/0013641 A1 | 1/2008 | Li et al. | |
| 2008/0118003 A1 | 5/2008 | Liu et al. | |
| 2008/0125134 A1 | 5/2008 | Usuda et al. | |
| 2008/0159203 A1 | 7/2008 | Choi et al. | |
| 2008/0165697 A1 | 7/2008 | Zeira et al. | |
| 2008/0267168 A1 * | 10/2008 | Cai et al. | 370/352 |
| 2008/0310400 A1 * | 12/2008 | Cai et al. | 370/352 |
| 2009/0316636 A1 | 12/2009 | Medapalli et al. | |

OTHER PUBLICATIONS

Non Final Office Action dated Nov. 28, 2011, for U.S. Appl. No.12/456,562, filed Jun. 18, 2009; 22 pages.
Final Office Action dated Apr. 2, 2012, for U.S. Appl. No. 12/456,562, filed Jun. 18, 2009; 26 pages.
Notice of Allowance dated Aug. 16, 2012, for U.S. Appl. No.12/456,562, filed Jun. 18, 2009; 8 pages.

* cited by examiner

Primary Examiner — Sulaiman Nooristany
(74) Attorney, Agent, or Firm — Sterne, Kessler, Goldstein & Fox P.L.L.C.

(57) ABSTRACT

Embodiments for a method and apparatus of selecting a transmission mode between the subscriber and a base station are disclosed. One method includes determining a predictive window. Instantaneous channel quality measurements are averaged, wherein the averaging is dependent upon a size of the predictive window. A first estimate of the transmission mode is determined based on the averaged instantaneous channel quality measurements. A margin is calculated based on reception of a qualifying downlink transmission. The transmission mode is selected by updating the first estimate with the margin.

20 Claims, 5 Drawing Sheets

SELECTING A TRANSMISSION MODE BETWEEN A SUBSCRIBER AND A BASE STATION

CROSS-REFERENCE TO RELATED APPLICATIONS/INCORPORATION BY REFERENCE

The present application is a continuation of U.S. patent application Ser. No. 12/456,562, filed Jun. 18, 2009, entitled "SELECTING A TRANSMISSION MODE BETWEEN A SUBSCRIBER AND A BASE STATION", which claims priority to U.S. Provisional Application No. 61/132,480, filed Jun. 18, 2008, both of which are herein incorporated by reference.

FIELD OF THE DESCRIBED EMBODIMENTS

The described embodiments relate generally to wireless communications. More particularly, the described embodiments relate to selecting a transmission mode between a subscriber and a base station.

BACKGROUND

Wireless networks are gaining popularity because wireless infrastructures are typically easier and less expensive to deploy than wired networks. However, wireless networks can be susceptible to environmental conditions, interference and self-interference. A popular wireless network implementation uses base stations that communicate with wireless user devices that are located within cells formed by the base stations.

Mobile wireless devices introduce additional problems because the transmission channels between the base stations and the mobile devices are constantly changing. The changing conditions of the transmission channels make it difficult to properly schedule the transmission of wireless information communicated between a base station and the mobile devices. That is, the data rate of the wireless communication is dependent upon the modulation (for example, QAM or 16-QAM) and the coding used for the wireless communication. The modulation and coding are typically selected based upon the quality of the transmission channels between the base station and the mobile subscribers.

It is desirable to have a method of selecting the modulation and/or coding of wireless communication which is adaptable for improving performance of wireless communication between a base station and a mobile subscriber.

SUMMARY

An embodiment includes a method of a subscriber selecting a transmission mode between the subscriber and a base station. The method includes determining a predictive window. Instantaneous channel quality measurements are averaged, wherein the averaging is dependent upon a size of the predictive window. A first estimate of the transmission mode is determined by accessing a look up table based on the averaged instantaneous channel quality measurements. A margin is calculated based on reception of a qualifying downlink transmission. The transmission mode is selected by updating the first estimate with the margin.

Another embodiment includes a method of selecting a transmission mode between the subscriber and a base station. The method includes determining a predictive window. Instantaneous channel quality measurements are averaged, wherein the averaging is dependent upon a size of the predictive window. A first estimate of the transmission mode is determined based on the averaged instantaneous channel quality measurements. A margin is calculated based on reception of a qualifying downlink transmission. The transmission mode is selected by updating the first estimate with the margin.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods and apparatuses for selecting a transmission mode (modulation and coding selection) between the subscriber and a base station. An embodiment includes the subscriber selecting the transmission mode. The transmission mode can be adaptively updated based on reception of downlink transmissions.

Figure 1:
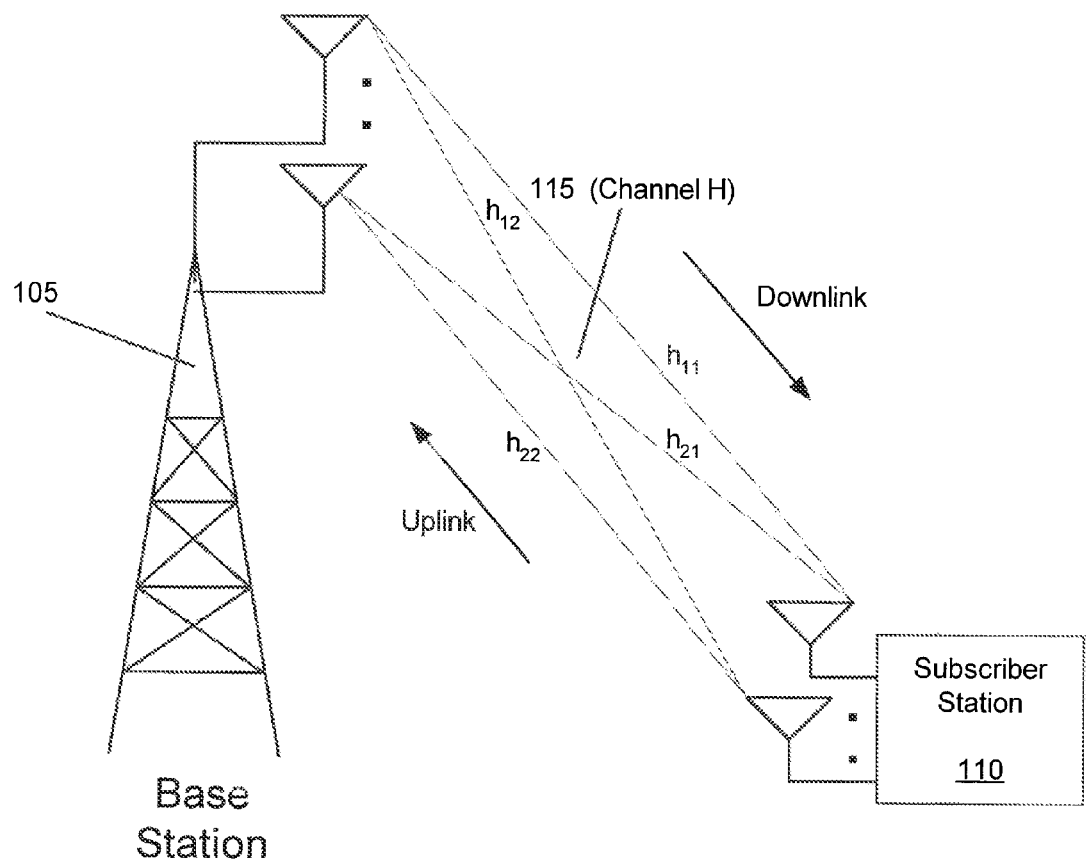
FIG. 1 illustrates an example of a wireless communication system that includes a pair of multiple antenna transceivers that embodiments of the methods of selecting a transmission mode between the subscriber and a base station are operable.

FIG. 1 illustrates an example of a wireless communication system that includes a base station 105 and a mobile subscriber 110 that embodiments of methods of selecting a transmission mode between the mobile subscriber 110 and a base station 105 are operable. A transmission channel H is formed between base station 105 and the mobile subscriber 110. For a mobile subscriber 110 that is physically moving relative to the base station 105, the transmission channel H is typically changing with the movement of the mobile subscriber 110. For multiple channel antenna (including one or more transmit antennas and one or more receive antennas) the transmission channel H include sub-channels, such as, $h_{11}$, $h_{12}$, $h_{21}$, $h_{22}$.

Wireless communication traveling from the base station 105 to the mobile subscriber 110 is typically referred to as "downlink transmission", and wireless communication traveling from the mobile subscriber 110 to the base station 105 is typically referred to as "uplink transmission".

Some embodiments include the base station of the wireless system scheduling the wireless communication and the scheduling is communicated to mobile subscribers through a control channel, also referred to as a MAP. The MAP can provide scheduling allocations, which for a multi-carrier system (such as an orthogonal frequency division multiplexing (OFDM)), designates sub-carriers and time slots in which downlink and uplink transmissions between the base station and each mobile subscriber are to occur.

Typically, the base station additionally selects a type of modulation and coding of the downlink and uplink wireless communication. The modulation and coding selection is typically referred to as "mode" or "MCS (modulation and coding selection)". The mode selection is typically dependent upon the quality of the transmission channel (for example, CINR (carrier to interference and noise ratio)). Therefore, for a mobile subscriber, the ideal mode selection typically varies over time as the quality of the transmission channel varies. Typically, the ideal mode selection for downlink transmission is different than the ideal mode selection for uplink transmission because the base station typically transmits signals at a higher power level than the mobile subscriber, and because the sources of interferences are different. That is, the downlink transmission typically has a higher CINR, and therefore, can support a higher-order modulation.

Figure 2:
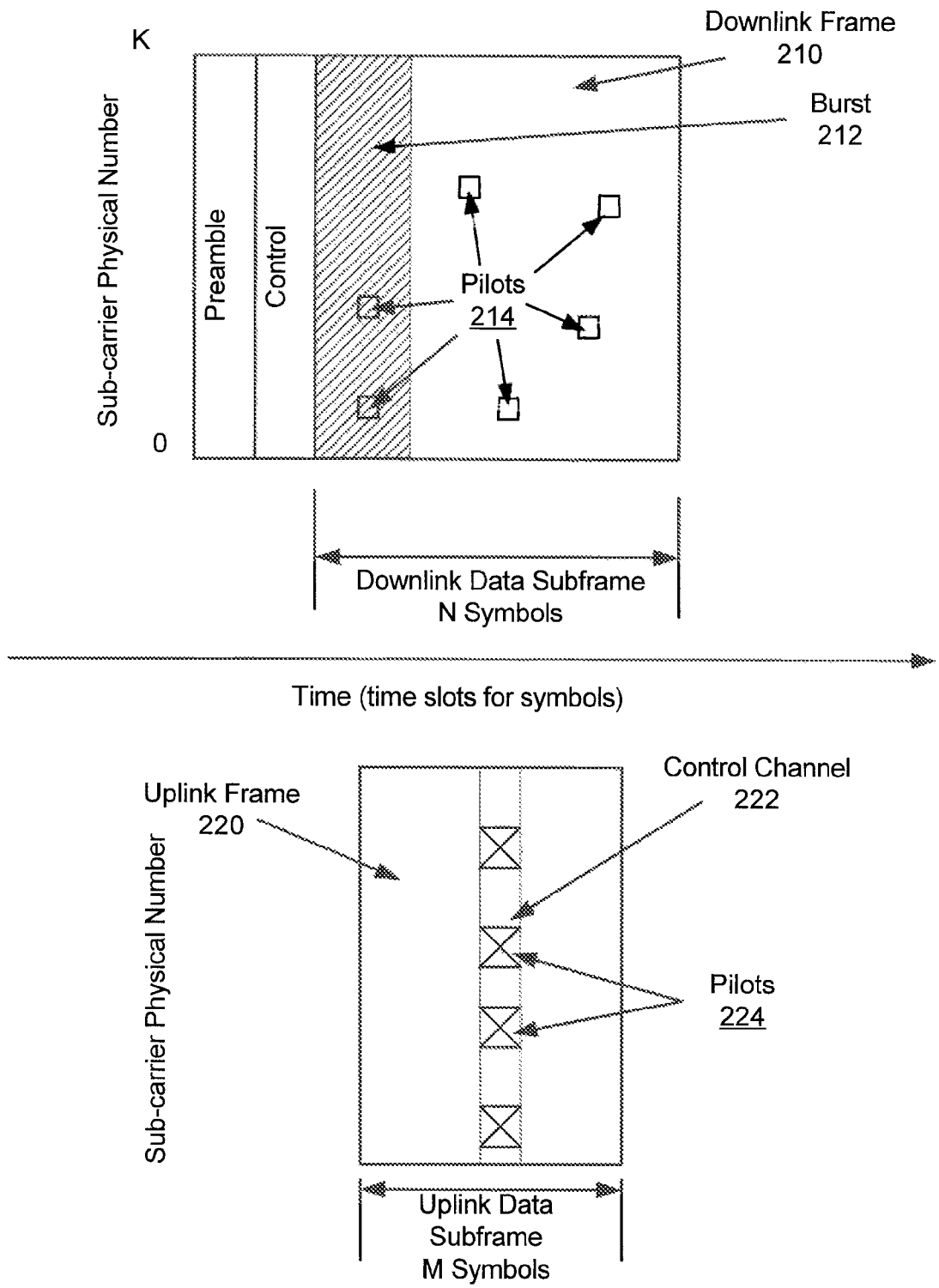
FIG. 2 shows an example of a transmission frame that includes a downlink sub-frame and an uplink sub-frame.

FIG. 2 shows an example of a transmission frame that includes a downlink sub-frame 210 and an uplink sub-frame 220. The downlink sub-frame 210 and the uplink sub-frame 212 occupy designated frequencies (for example, sub-carriers of a multi-carrier signal), and time allocations. As shown, the downlink sub-frame occupies K sub-carriers, and N symbols. The uplink sub-frame occupies K sub-carriers, and M symbols. The downlink sub-frame 210 and the uplink sub-frame can be within TDD (time division duplex) or FDD (frequency division duplex) systems.

Embodiments of the downlink sub-frame 210 include a preamble, control information, an exemplary burst 212 and pilots 214. The preamble generally includes a set of pilot tones that are known a priori to the base station and the subscriber, and can be used for estimation of the transmission channel between the base station and the subscriber. The control information (which can be, for example, a MAP) provides scheduling information that is generated by the base station, and informs downlink subscribers when (and, for example, over which sub-carriers) uplink and downlink transmission is to occur. The exemplary burst 212 is a downlink data transmission to a subscriber as dictated by the control information. The pilots 214 can be used for additional channel estimation.

Embodiments of the uplink sub-frame include data symbols, but also include a control channel 222, and pilot tones 224. The control channel 222 can be used to allow the subscriber to communicate information, such as, a mode selection, to the base station. The control information is generally a substantially periodic communication.

Generally, the scheduling of the downlink sub-frame 210 and the uplink sub-frame is dependent upon the mode selection being used for the downlink and uplink transmission. That is, for a data rate, or desire QoS (quality of service), a certain amount of data per unit of time must be communicated between the base station and the subscriber. Clearly, the mode selection influences how the base station allocates the downlink and uplink transmission as determined by the control information.

Some wireless system embodiments include the base station selecting the transmission mode (MCS) for both the downlink and the uplink transmission. For a TDD system, reciprocity of the transmission channel can be assumed, and therefore, the base station can assume that downlink channel is approximately the same as the downlink channel. However, for a rapidly changing transmission channel, the reciprocity assumption may not be valid due to a large time lag between the time the channel quality is estimated and the time of scheduling. Additionally, the base station may receive uplink transmissions from the subscriber that are infrequent, and therefore, the downlink channel estimate of the base station may be stale.

For an FDD system, the downlink mode selection can be made at the subscriber because the base station does not have a way to estimate the downlink channel on its own.

As described, embodiments include making a first estimate of the mode selection which is adaptively updated based on additional measurements of downlink transmissions. Embodiments include qualifying the downlink transmission based on certain characteristics of the downlink transmissions, such as, success and/or failure of downlink transmission of blocks of data having certain mode or MCS characteristics. For example, a mode can be selected by a subscriber. The base station may transmit downlink data using the selected mode, or the base station may vary the mode of the downlink transmission based on, for example, available downlink transmission allocations, an amount of data for downlink transmission, a desired downlink transmission rate, a desired downlink data transmission error rate, and desire QoS of the downlink transmission. The varied mode selections of the downlink transmissions can be used to improve the downlink mode selection of the subscriber.

Figure 3:
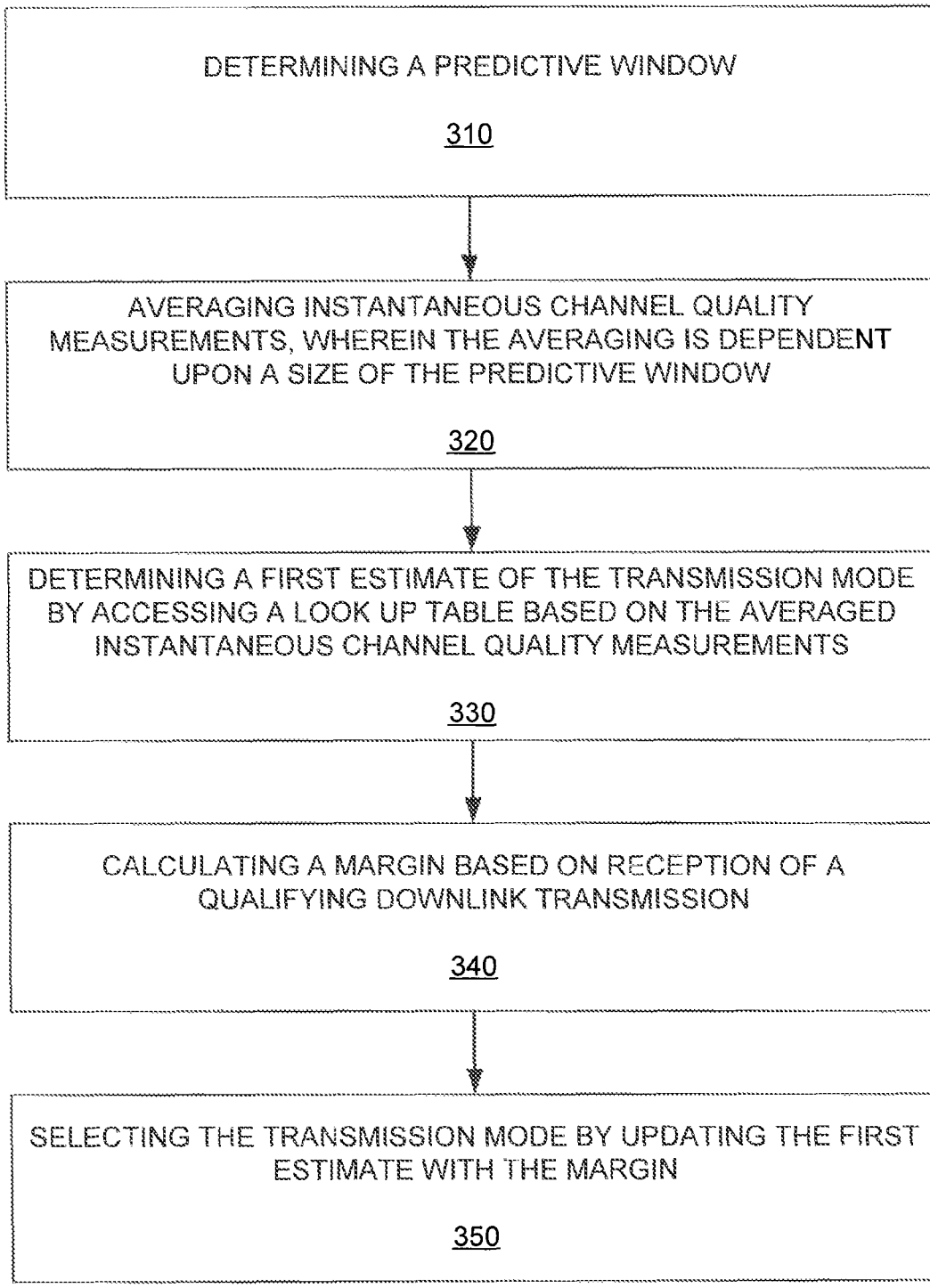
FIG. 3 shows a flow chart of steps of an example of a method of selecting a transmission mode between the subscriber and a base station.

FIG. 3 shows a flow chart of steps of an example of a method of selecting a transmission mode between the subscriber and a base station. A first step 310 includes determining a predictive window. A second step 320 includes averaging instantaneous channel quality measurements, wherein the averaging is dependent upon a size of the predictive window. A third step 310 includes determining a first estimate of the transmission mode by accessing a look up table based on the averaged instantaneous channel quality measurements. A fourth step 340 includes calculating a margin based on reception of a qualifying downlink transmission. A fifth step 350 includes selecting the transmission mode by updating the first estimate with the margin.

An embodiment includes selecting the predictive window based on an estimation of a frequency of variations in the downlink channel. The frequency of the variations of the downlink channel can be estimated, for example, using the preamble of a downlink frame. The preamble includes a set of pilot tones that are known to both the base station and the subscriber. The subscriber can use these pilot tones to continually monitor the variations of the downlink channel, and therefore, measure the frequency of the variations. Alternatively, or additionally, the subscriber can monitor the variations of the downlink channel using pilot tones located within downlink data of the downlink frame. Using the preamble and/or the pilot tones within, for example, a burst, the frequency variations can be estimated based upon an estimate of the Doppler frequency.

One embodiment includes the subscriber selecting the predictive window, and another embodiment includes the base station selecting the predictive window.

If for example, the subscriber is selecting the predictive window, the predictive window can include a number of transmission frames that is dependent, for example, on an estimate of mobility of the subscriber. The number of frames can be dependent upon an averaging parameter, wherein the averaging parameter is dependent on the mobility of the subscriber. The mobility can be determined, for example, by estimating the Doppler frequency estimate of the subscriber.

Another embodiment includes determining a predictive window based on monitoring how frequently a base station requests feedback of a downlink channel. The requests can provide an indication of how fast the downlink channel is changing.

As described, the instantaneous channel quality measurements can be averaged. An embodiment includes a number of instantaneous channel quality measurements that are averaged being dependent upon the size of the predictive window.

Based upon the averaged instantaneous channel quality measurements, a first estimate of the transmission mode can be selected. For this embodiment, the first estimate is based on the look up table, and the averaged instantaneous channel quality measurements. For one embodiment, the look up table is selected based on at least one of an expected wireless environment or a data type being communicated. This can additionally, or alternatively include a desired QoS of the transmission data. That is, a higher QoS may dictate a more conservative mode (lower MCS), whereas a lower QoS may allow a more aggressive mode (higher MCS).

For an embodiment, the qualified downlink transmissions are bursts, that includes a number of blocks (for example, forward error correction (FEC) blocks). It should be noted that the qualified downlink transmissions could alternatively include a protocol data unit (PDU), which includes many FEC blocks. Based on successful or unsuccessful reception of the qualified downlink transmission, the first selection of the transmission mode is adaptively updated. For an embodiment, the first selection of the transmission mode is adaptively updated based on a margin, wherein the margin is adaptively updated based on the successful or unsuccessful reception of the qualified downlink transmissions.

For one embodiment, the margin is adaptively increased if the qualifying downlink transmission is inferred to be incorrectly (unsuccessfully) received. The qualifying downlink transmission can be inferred to be incorrectly received, if, for example, a cyclic redundancy check (CRC) within an FEC block is unsuccessfully received. Alternatively, the qualifying downlink transmission can be inferred to be incorrectly received, if, for example, a confidence level of the output of a block FEC decoder is below a threshold.

For an embodiment, qualified downlink transmission that suggests an increase in the margin includes a burst that is scheduled by the base station that includes a lower or equal spectral efficiency than, for example, the J most recently recommended modes (MSC and spatial rate), and/or a smaller size of B-bytes (where the B-bytes includes a reference burst having a size that is known to both the base station and the subscriber), and the qualified downlink transmission is inferred to be incorrectly received.

For another embodiment, the margin is adaptively decreased if the qualifying downlink transmission is inferred to be correctly received. The qualifying downlink transmission can be inferred to be correctly received, if, for example, a cyclic redundancy check (CRC) within an FEC block is successfully received. Alternatively, the qualifying downlink transmission can be inferred to be correctly received, if, for example, a confidence level of the output of a block FEC decoder is above a threshold.

For an embodiment, qualified downlink transmission that suggest a decrease in the margin includes a burst that is scheduled by the base station that includes a higher or equal spectral efficiency than, for example, the J most recently recommended modes (MSC and spatial rate), and/or a larger size of B-bytes (where B is known to both the base station and the subscriber), and the qualified downlink transmission is inferred to be correctly received.

Additionally, the margin can decay over time if no qualifying downlink transmissions are scheduled by the base station.

The qualified downlink transmission that includes a mode different than the mode selected by the subscriber can naturally occur during the scheduling of downlink transmission by the base station. For example, the base station may be willing to suffer a higher error rate (for example, a lower QoS), and therefore, select a more aggressive mode. The subscriber can opportunistically observe the success/failure of bursts transmitted using the more aggressive mode selection, and therefore, improve its mode selection. The base station may have data packets for downlink transmission that do not match the block sizes that would naturally occur based on the selected mode. Scheduling of these data packets may result in modes different than the selected mode. Again, the subscriber can opportunistically use these other modes (either higher or lower) to improve its mode selection.

Additionally, or alternatively, a desired quality of service (QoS) is used for determination of whether a downlink transmission is designated as a qualified downlink transmission. For example, a connection identifier of the transmission should match the connection identifiers associated with one of QoS profiles that the mobile station is using. If there is a match, then the transmission is considered a qualifying transmission and not otherwise.

Additionally, or alternatively, a desired quality of service (QoS) is used for determination of the margin. That is, for example, data of different subscribers may desire or require a particular block error rate (BLER). In order to maintain the desired or require BLER, the margin may have to be conservatively selected to ensure proper downlink transmission.

As previously mentioned, the selected transmission mode can be for downlink transmission, and/or uplink transmission.

Figure 4:
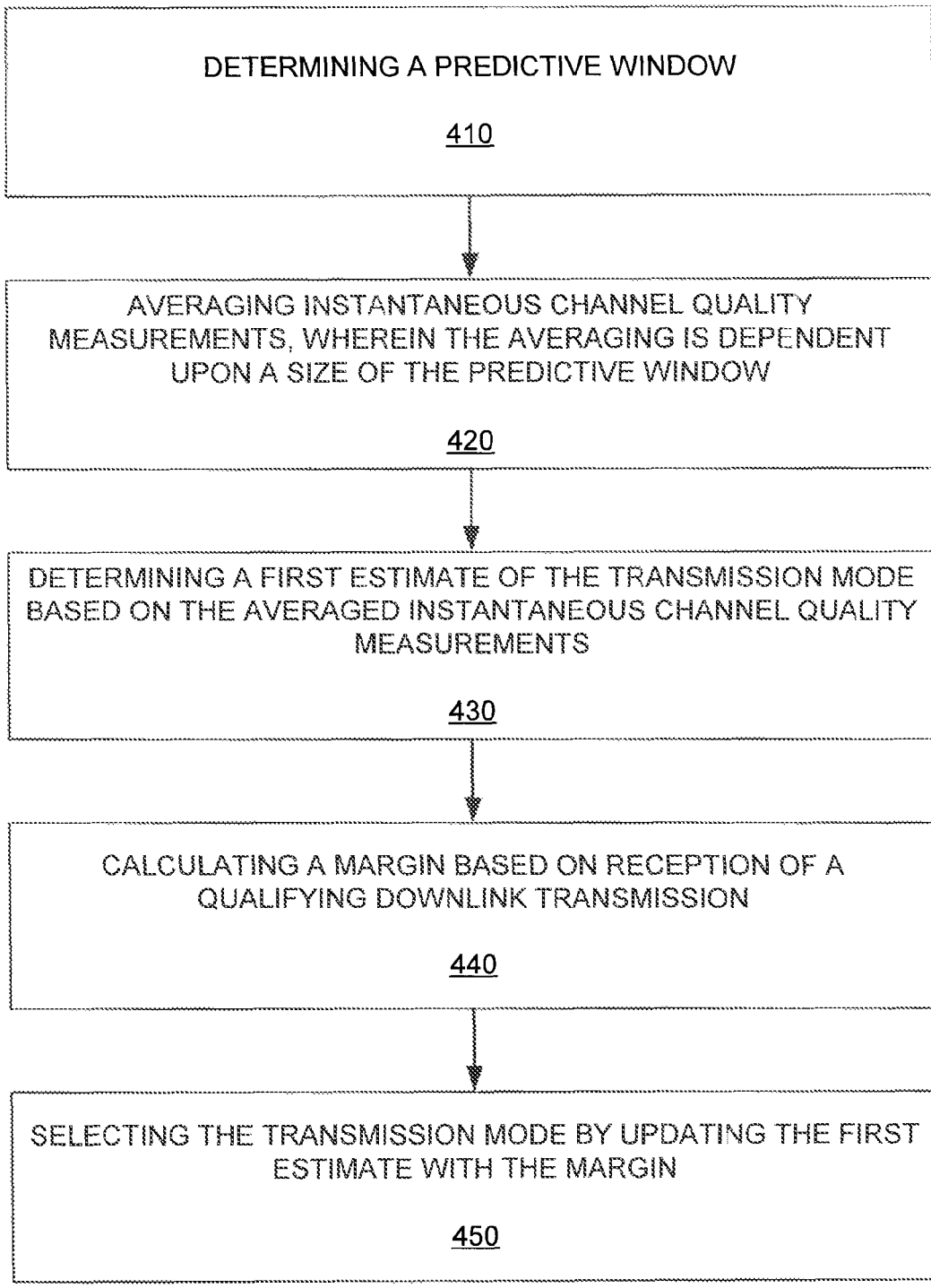
FIG. 4 shows a flow chart of steps of another example of a method of selecting a transmission mode between the subscriber and a base station.

FIG. 4 shows a flow chart of steps of another example of a method of selecting a transmission mode between the subscriber and a base station. A first step 410 includes determining a predictive window. A second step 420 includes averaging instantaneous channel quality measurements, wherein the averaging is dependent upon a size of the predictive window. A third step 430 includes determining a first estimate of the transmission mode based on the averaged instantaneous channel quality measurements. A fourth step 440 includes calculating a margin based on reception of a qualifying downlink transmission. A fifth step 450 includes selecting the transmission mode by updating the first estimate with the margin.

For an embodiment, the first estimate of the transmission mode based on the averaged instantaneous channel quality measurements includes algorithmically selecting the first estimate based on the averaged instantaneous channel quality measurements.

Figure 5:
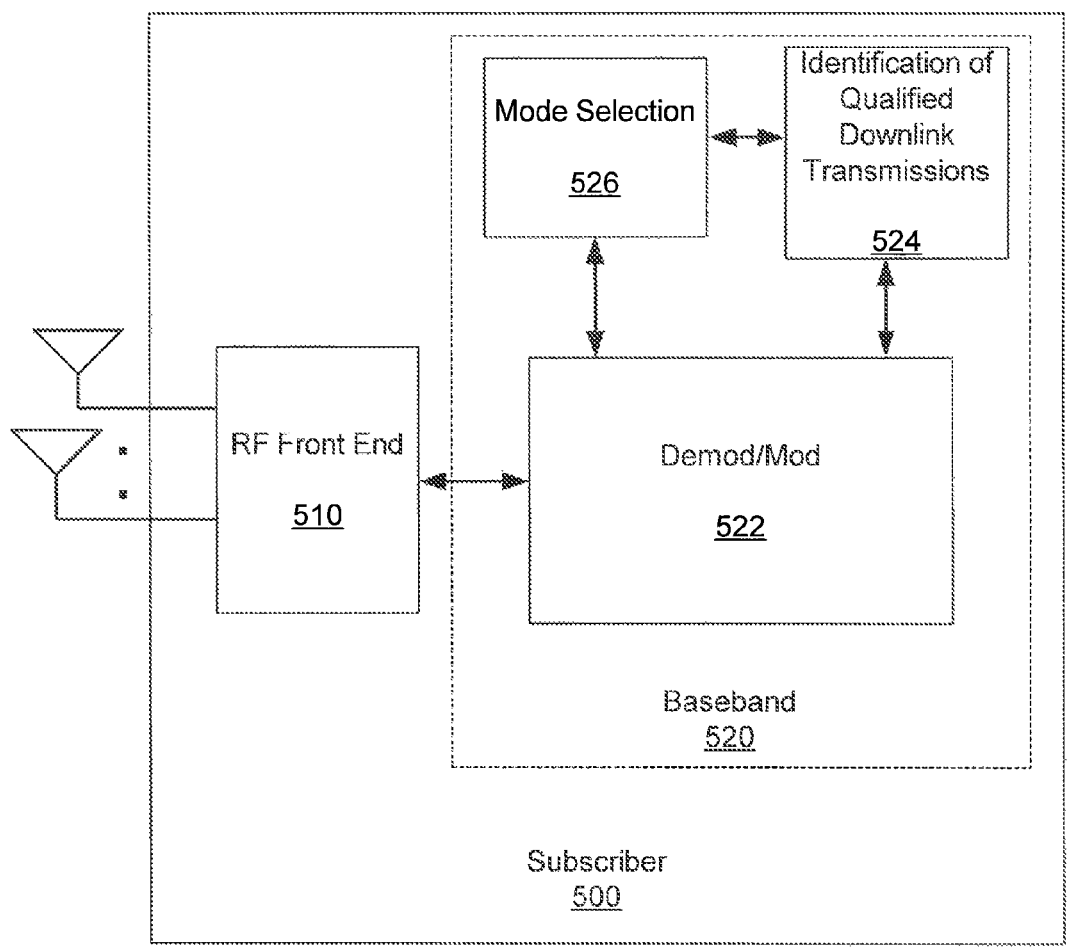
FIG. 5 shows a block diagram of an example of a wireless mobile subscriber.

FIG. 5 shows a block diagram of an example of a wireless mobile subscriber 500 that can utilize the mode selection embodiments described. As shown, the subscriber 500 includes an RF front-end 510 and base-band processing. The base-band processing includes a demodulator 522 (also modulator for uplink transmission), qualifying downlink transmission processing 524, and mode selection processing.

For an embodiment, the subscriber 500 includes at least portions of the previously described processing, including means for determining a predictive window, means for averaging instantaneous channel quality measurements, wherein the averaging is dependent upon a size of the predictive window, means for determining a first estimate of a transmission mode by accessing a look up table based on the averaged instantaneous channel quality measurements, means for calculating a margin based on reception of a qualifying downlink transmission, and means for selecting the transmission mode between the subscriber and a base station by updating the first estimate with the margin.

Although specific embodiments have been described and illustrated, the embodiments are not to be limited to the specific forms or arrangements of parts so described and illustrated.

What is claimed is:

1. A mobile subscriber device, comprising:
   a radio frequency front end processor;
   a baseband processor that exchanges signals with the radio frequency front end processor, wherein the baseband processor includes:
      a modulator/demodulator for modulating and demodulating transmissions;
      a mode selector; and
      a qualified downlink transmission identifier, wherein the mode selector and the qualified downlink transmission identifier are configured to:
      determine a predictive window;
      determine a first estimate of a transmission mode based on averaged channel quality measurements, which are dependent upon a size of the predictive window;
      calculate a margin based on reception of a qualifying downlink transmission;
      decrease the margin upon an inference that the qualifying downlink transmission is correctly received and a determination that a burst that is scheduled by a base station includes a higher or equal spectral efficiency than a spectral efficiency of a set of N most recently selected transmission modes, where N is a positive integer greater than 1; and
      select the transmission mode between the mobile subscriber device and the base station by updating the first estimate with the margin.

2. The device of claim 1, wherein determining the predictive window comprises selecting the predictive window based on an estimation of a frequency of variations in a downlink channel between the mobile subscriber device and the base station.

3. The device of claim 1, wherein determining the predictive window comprises monitoring how frequently the base station requests feedback of a downlink channel between the mobile subscriber device and the base station.

4. The device of claim 1, wherein determining the predictive window includes a number of transmission frames that depend on a mobility of the mobile subscriber device.

5. The device of claim 1, wherein determining the predictive window comprises the base station determining the predictive window.

6. The device of claim 1, wherein determining the predictive window comprises the mobile subscriber device determining the predictive window.

7. The device of claim 1, wherein a number of channel quality measurements that are averaged is dependent upon the size of the predictive window.

8. The device of claim 1, wherein determining a first estimate of the transmission mode includes accessing a look up table based on the averaged channel quality measurements.

9. The device of claim 8, wherein the look up table is selected based on one or more of an expected wireless environment, a data type being communicated, or a desired quality of service for transmission data.

10. The device of claim 1, wherein the qualifying downlink transmission comprises a burst.

11. The device of claim 1, wherein a desired quality of service (QoS) is used for determination of whether a downlink transmission is designated as a qualified downlink transmission.

12. The device of claim 11, wherein determination of whether a downlink transmission is designated as a qualified downlink transmission comprises matching a connection identifier of the downlink transmission with a connection identifier of a particular QoS profile which a user of the mobile subscriber device is expecting.

13. The device of claim 12, wherein the desired QoS is used for determination of the margin.

14. The device of claim 1, wherein the qualifying downlink transmission includes forward error correction (FEC) blocks that include a cyclic redundancy check (CRC).

15. The device of claim 14, wherein the qualifying downlink transmission can be inferred to be correctly received if the cyclic redundancy check (CRC) is successfully received or a confidence level of an output of a block FEC decoder is above a threshold.

16. The device of claim 1, wherein the margin decays over time if no qualifying downlink transmissions are scheduled by the base station.

17. A mobile subscriber device, comprising:
   a radio frequency front end processor;
   a baseband processor that exchanges signals with the radio frequency front end processor, wherein the baseband processor includes:
      a modulator/demodulator for modulating and demodulating transmissions;
      a mode selector; and
      a qualified downlink transmission identifier, wherein the mode selector and the qualified downlink transmission identifier are configured to:
      determine a predictive window;
      determine a first estimate of a transmission mode by accessing a look up table based on averaged channel quality measurements, which are dependent upon a size of the predictive window;
      calculate a margin based on reception of a qualifying downlink transmission;
      increase the margin upon an inference that the qualifying downlink transmission is incorrectly received and a determination that a burst that is scheduled by a base station includes a lower or equal spectral efficiency than a spectral efficiency of a set of N most recently selected transmission modes, where N is a positive integer greater than 1; and
      select the transmission mode between the mobile subscriber device and the base station by updating the first estimate with the margin.

18. The device of claim 17, wherein determining a predictive window comprises selecting the predictive window based on an estimation of a frequency of variations in a downlink channel between the mobile subscriber device and the base station.

19. The device of claim 17, wherein determining the predictive window comprises monitoring how frequently the base station requests feedback of a downlink channel between the mobile subscriber device and the base station.

20. The device of claim 17, wherein determining the predictive window includes a number of transmission frames that depend on a mobility of the mobile subscriber device.

* * * * *